(No Model.)
J. W. BLEVIN.
Apparatus for Bluestoning Wheat.
No. 238,637. Patented March 8, 1881.
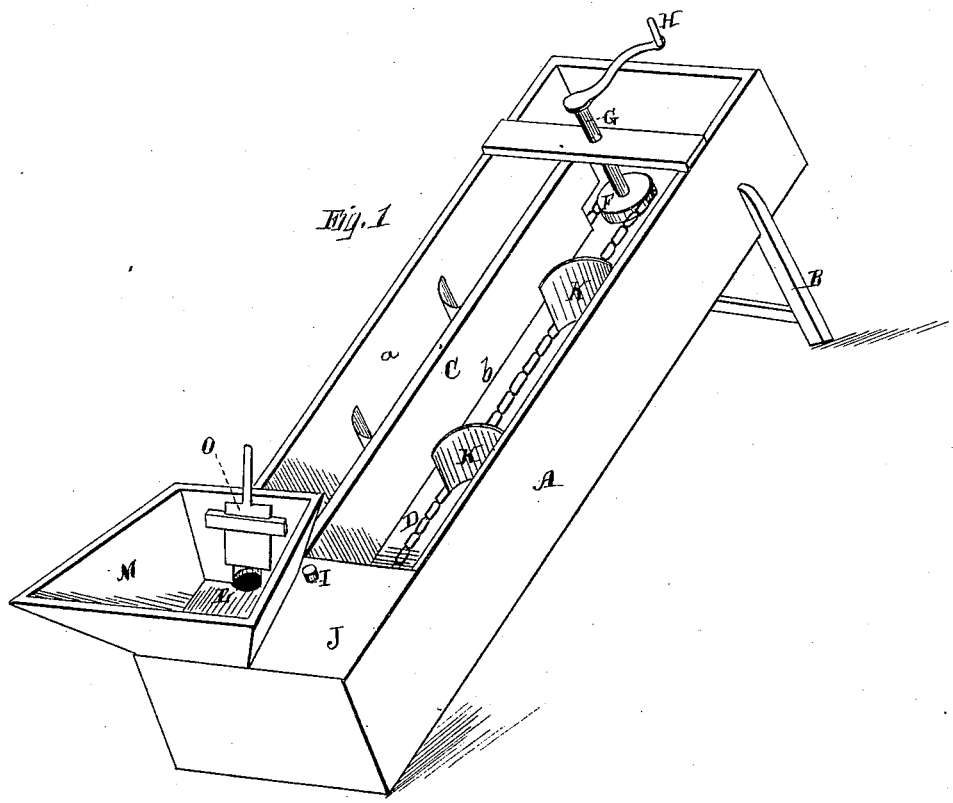
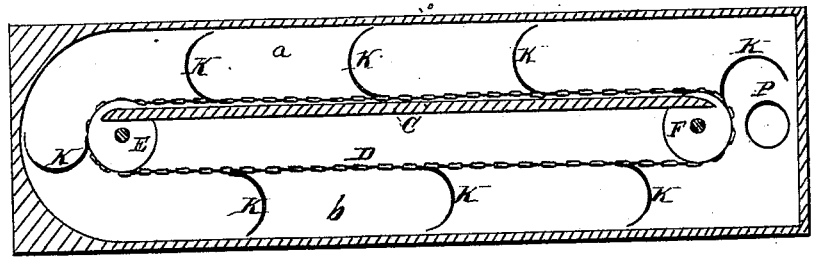
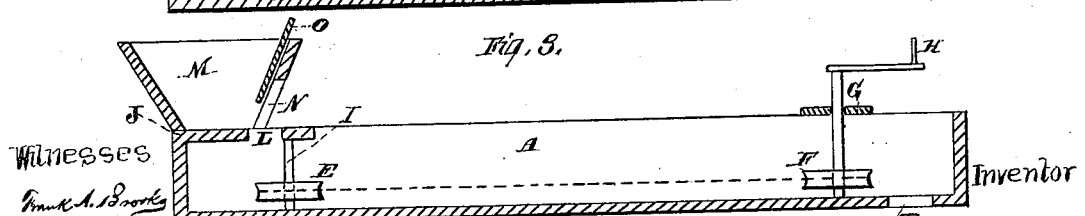
Witnesses
Frank A. Brooks
Geo. H. Strong
Inventor
Jos. W. Blevin
By Dewey & Co.
Attys

UNITED STATES PATENT OFFICE.

JOSEPH W. BLEVIN, OF YUBA CITY, CALIFORNIA, ASSIGNOR OF ONE-HALF TO WILLIAM T. BLEVIN, OF SAME PLACE.

APPARATUS FOR BLUESTONING WHEAT.

SPECIFICATION forming part of Letters Patent No. 238,637, dated March 8, 1881.

Application filed November 4, 1880. (No model.)

*To all whom it may concern:*

Be it known that I, JOSEPH W. BLEVIN, of Yuba City, county of Sutter, State of California, have invented an Apparatus for Bluestoning Wheat; and I hereby declare the following to be a full, clear, and exact description thereof.

My invention relates to a novel apparatus for bluestoning wheat, whereby the rust or smut which develops on growing grain and is produced by foul seed is prevented.

It consists of an inclined trough containing a solution of sulphate of copper, and into which the wheat is conducted, and is carried up through the solution by scoops or buckets to the upper end of the trough and discharged.

Referring to the accompanying drawings, Figure 1 is a perspective view of my device. Fig. 2 is a horizontal longitudinal section. Fig. 3 is a vertical longitudinal section.

Let A represent an elongated trough supported at an incline by the feet B, and divided into two compartments by the partition C, which is shorter than the trough, and placed so as to allow the two divisions to open into one another, both at the top and bottom. Let the smaller division be called $a$ and the larger $b$.

Within the trough, near its bottom, is the chain-belt D, supported by and moving around the chain-pulleys E and F, provided with journals at right angles to the bottom, one at the upper end and the other at the lower end in the line of the partition, said pulleys being operated by the upright shaft G and hand-crank H. The lower one is set upon the spindle I, supported by the roof or covering J at the lower end of the box.

To the chain-belt D are fastened the vertical curved scoops, buckets, or dippers K, of a width nearly equal, together with the said belt D, to the width of the smaller division $a$. The belt D in rotating passes around the pulleys up one compartment and down the other, carrying the curved scoops with it. The buckets K are preferably made in the form of a curved plate, one edge being attached to the chain and the curve in a horizontal plane, as shown, so that they simply draw the grain up, resting on the floor of the compartment, which allows it to be well drained in passing up, and to fall through the discharge-opening when it reaches the proper point. The belt D need not be a chain belt, running over chain-pulleys, as here shown, but may be any kind of belt to which scoops or conveyers can be conveniently attached.

In the top of the roof J is the opening L, formed over the lower end of the smaller division. The hopper M is set upon the roof J, so that its mouth N will correspond with the opening L. A slide, O, closes the mouth N. An opening, P, at the upper end of the division $a$, conducts the wheat to the sack.

The operation of my invention will be as follows: Into the trough A a solution of sulphate of copper is put. On account of the inclined position of the trough the liquid will remain at the lower end. The wheat is poured into the hopper M, which, being at the lower end, is within convenient reach. It drops into the bath, being directed by the opening L in front of an approaching scoop; and when the crank H is turned the scoops K carry it up through the bath to the opening P, and it is discharged into the sack hung under the opening, which the height of the trough allows conveniently to be done. A gate in the feed-hopper may regulate the supply to the tank. If any grains should get under the scoops they are not crushed, but the scoops are lifted up and pass over them without breaking. The constant motion of the scoops about the lower pulley keeps the solution well stirred and mixes in the grain, so that it becomes thoroughly wet or saturated.

I am aware that apparatus has been heretofore used by which wheat is conducted through a solution of blue-stone; but the elevating device has consisted of a screw in the flange or thread of which the wheat is frequently caught. In that there is the disadvantage of the conductor acting in a contracted space, and so when any of the grains are caught between the thread and walls of the chamber they are cracked or bruised so as to injure them for seed purposes. Moreover, the friction of the parts is so great as to require considerable power to operate them. All these disadvantages are obviated by my invention, in which the wheat is not cracked or crushed, and the whole apparatus is easy to turn.

Having thus described my invention, what I claim as new, and desire to secure by Letters Patent, is—

The box A, provided with legs B at one end, a central longitudinal partition, C, arranged at right angles to the bottom of the box, the hopper M, opening L, and roof J, in combination with the pulleys E and F, having spindles at right angles to the bottom of the box, endless chain D, provided with vertical curved buckets K, crank H, and discharge-opening P, all constructed, arranged, and operated as set forth.

In witness whereof I have hereunto set my hand.

JOSEPH W. BLEVIN.

Witnesses:
H. C. JONES,
W. T. BLEVIN.